US012794838B2

(12) United States Patent
Manning et al.

(10) Patent No.: US 12,794,838 B2
(45) Date of Patent: Nov. 10, 2026

(54) CONTEXTUAL INTERSTITIALS

(71) Applicant: Malibu Entertainment, Inc., Oakland, CA (US)

(72) Inventors: Damian Franken Manning, New York, NY (US); Samuel Evan Sandberg, Brooklyn, NY (US)

(73) Assignee: Malibu Entertainment, Inc., Oakland, CA (US)

(*) Notice: Subject to any disclaimer, the term of this patent is extended or adjusted under 35 U.S.C. 154(b) by 0 days.

(21) Appl. No.: 18/111,730

(22) Filed: Feb. 20, 2023

(65) Prior Publication Data

US 2023/0208791 A1 Jun. 29, 2023

Related U.S. Application Data

(63) Continuation of application No. 16/051,716, filed on Aug. 1, 2018, now Pat. No. 11,611,521, which is a (Continued)

(51) Int. Cl.
*H04L 51/10* (2022.01)
*H04L 51/52* (2022.01)
(Continued)

(52) U.S. Cl.
CPC .............. *H04L 51/10* (2013.01); *H04L 51/52* (2022.05); *H04L 67/52* (2022.05); *H04N 21/812* (2013.01)

(58) Field of Classification Search
CPC ......... H04L 51/10; H04L 51/32; H04L 67/18; H04L 51/52; H04L 67/52; H04N 21/8133;
(Continued)

(56) References Cited

U.S. PATENT DOCUMENTS 9,223,830 B1 * 12/2015 Dzik .................... G06F 40/103
9,747,285 B1 * 8/2017 Laufer ................ G06F 16/9537
(Continued)

OTHER PUBLICATIONS

U.S. Appl. No. 62/057,651, filed Sep. 9, 2014, Bumgarner William M.

*Primary Examiner* — Tan Doan
(74) *Attorney, Agent, or Firm* — Lee & Hayes, P.C.

(57) ABSTRACT

An interstitial message server system selects a like interstitial message that corresponds to a like user event generated by a user, a skip interstitial message corresponding to a skip user event generated by the user and a playthrough interstitial message corresponding to a play through user event. The like, skip and playthrough interstitial messages can be selected based upon an identifier of a media object that can be presented to the user. At least one each of the like, skip and playthrough interstitial messages can be sent to a user computer before or during the presentation of a media object. While or after the media object is presented to the user at the user computer, the user computer can be caused to detect a like, skip or playthrough user event with respect to the media object. The user computer can be caused to present the like, skip or playthrough interstitial message that was received by the computer and that corresponds to the detected like, skip or playthrough user event with minimal delay from the time the user event is detected.

20 Claims, 3 Drawing Sheets

Related U.S. Application Data continuation of application No. 14/951,227, filed on Nov. 24, 2015, now Pat. No. 10,050,916.

(60) Provisional application No. 62/083,839, filed on Nov. 24, 2014.

(51) Int. Cl.
*H04L 67/52* (2022.01)
*H04N 21/81* (2011.01)

(58) Field of Classification Search
CPC .. H04N 21/812; H04N 21/85; G06Q 30/0271; G06Q 30/0276
USPC .......................................................... 709/207
See application file for complete search history.

(56) References Cited

U.S. PATENT DOCUMENTS

| | | | | |
|---|---|---|---|---|
| 2002/0178446 | A1* | 11/2002 | Sie | H04N 5/76 348/E7.071 |
| 2005/0038900 | A1 | 2/2005 | Krassner | |
| 2005/0094965 | A1 | 5/2005 | Chen | |
| 2006/0184982 | A1 | 8/2006 | Paz | |
| 2008/0255977 | A1 | 10/2008 | Altberg | |
| 2008/0319833 | A1* | 12/2008 | Svendsen | H04L 69/00 707/999.005 |
| 2009/0049090 | A1 | 2/2009 | Shenfield | |
| 2010/0023393 | A1 | 1/2010 | Costy | |
| 2010/0222035 | A1 | 9/2010 | Robertson | |
| 2011/0218044 | A1 | 9/2011 | Joshi | |
| 2011/0219402 | A1 | 9/2011 | Candelore | |
| 2013/0014190 | A1* | 1/2013 | Sansom | G06F 16/735 348/569 |
| 2014/0304228 | A1 | 10/2014 | Palaniappan | |
| 2015/0143413 | A1* | 5/2015 | Hall | H04N 21/4667 725/34 |
| 2015/0332335 | A1 | 11/2015 | Abraham | |
| 2015/0339728 | A1 | 11/2015 | Sura | |
| 2018/0218395 | A1 | 8/2018 | Strobl | |
| 2018/0376178 | A1* | 12/2018 | Cormican | H04N 21/4316 |
| 2020/0133973 | A1 | 4/2020 | Justin | |

* cited by examiner

CONTEXTUAL INTERSTITIALS

BACKGROUND

A media recommendation service selects a user-specific subset of media objects from the universe of available media objects that the service determines may be enjoyed by the user. The selected media object can be provided to the user through a network to be rendered on a device of the user, such as a mobile device. A media object can be a song, video, animation, document or other media entity. When a user of the system begins a new session, the user can be associated with the subset of the recommended media items corresponding to the user.

BRIEF SUMMARY

A media object recommendation system may utilize user feedback such as explicit "like" (explicit positive feedback), "played through" (which may be implicit positive feedback) and "skip" (possibly negative feedback) indications made by the user.

In accordance with certain implementations of the disclosed subject matter, an interstitial message server system can select a like interstitial message that corresponds to a like user event generated by a user, a skip interstitial message corresponding to a skip user event generated by the user and a playthrough interstitial message corresponding to a play through user event. The like, skip and playthrough interstitial messages can be selected based upon an identifier of a media object that can be presented to the user. At least one each of the like, skip and playthrough interstitial messages can be sent to a user computer before or during the presentation of a media object. While or after the media object is presented to the user at the user computer, the user computer can be caused to detect a like, skip or playthrough user event with respect to the media object. The user computer can be caused to present the like, skip or playthrough interstitial message that was received by the computer and that corresponds to the detected like, skip or playthrough user event with minimal delay from the time the user event is detected.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
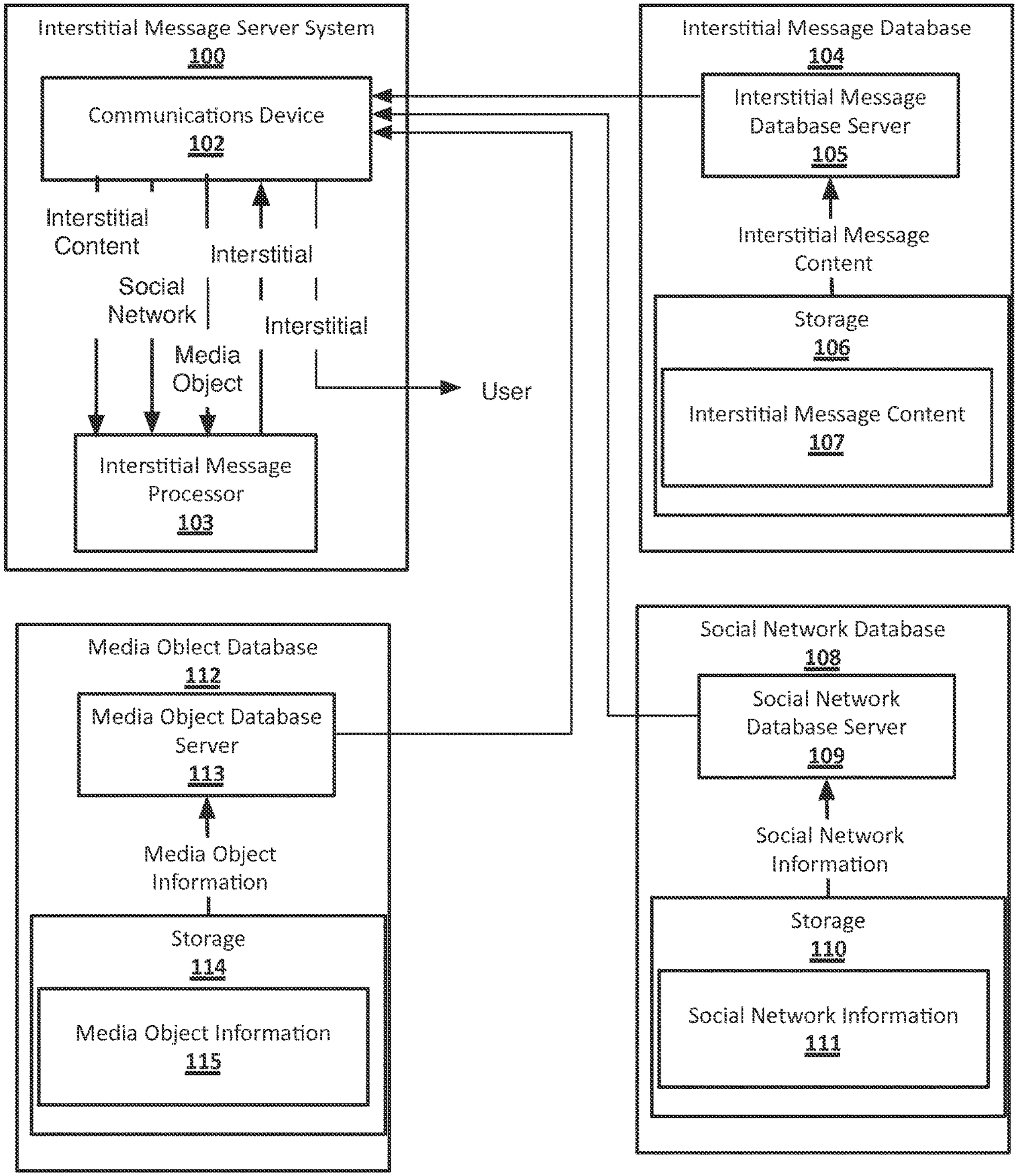
FIG. 1 shows an example of an Interstitial Message Server System, an Interstitial Message Database, a Social Network Database and a Media Object Database.

According to embodiments disclosed herein, a media recommendation system can select and present one or more contextually relevant interstitial messages based on a given piece or pieces of content, such as a song or a group of songs. An interstitial message may include audio, image, video or text content and may be presented before, during or after a given piece of content, such as song. An interstitial message may relate to any suitable topic, and may include information about a song (such as lyrics, authorship, release date) or artist (including name, photographs, videos), information about the listener or members of her social network, how the user or her social network interacts with the song or artist or relate to something other than the media object.

In one embodiment, three types of interstitial messages can be selected, one for each of the following scenarios: the song is "liked"; the song is skipped; and the song is played all the way through. More than one interstitial message can be selected for each of these types. The set of selected interstititials (including interstitials of one or more type) can be selected for a given user, a given user profile, a given set of users or for all users. The selected interstitials can be ordered (and queued) from first to be served to last to be served. The appropriate interstitial can be delivered based on which one of these listener actions occurs and its order in a queue.

Examples of interstitial messages may include an indication of how popular a song or artist is system-wide or within one or more listener's social network; which friends of the listener also recently played, liked or skipped the song or artist; an advertisement; and a purchasing opportunity, such as an opportunity to purchase tickets to an upcoming concert in the listener's city.

For example, as a song is being listened to, that song may be the fifth most popular song among the listener's group of friends. Such a fifth most popular song can be identified as the fifth-ranked song from an ordered aggregate list of the number of times each song has been played by all of that listener's friends. The system can associate an interstitial message with the song that indicates, "that song is fifth most popular among your friends." This can be displayed to a user as an overlay to a media object, in a text box, with a graphic, video and/or audibly.

In an example, if a listener likes a song, that song may have been liked by ten other listeners. The system may alert the listener with an interstitial message indicating, "10 of your friends also liked this song." The message may be presented to the user between songs, shortly after the user has liked the song or later during the play of the song. The interstitial may also include one or more profile photos of the other listeners.

The context of a song being listened to may be taken into account in selecting an appropriate interstitial. For example, a song that is classified in the Hip-Hop genre and was released prior to a certain year, 1986 for example, may be accompanied by the interstitial, "Old School," and include a photograph of a crowd breakdancing.

In an implementation, if the artist "Animal Collective" is being listened to and the listener is located near New York City, the system may search one or more databases of concert data and select and send an interstitial to the user that includes the message, "Animal Collective is playing Brooklyn Bowl next Friday!" The listener may also be presented with an opportunity to click a link and purchase tickets for the show. If the listener skipped the same song before or during the time it was played, the interstitial may not be delivered because the system can interpret the skip to mean that the listener would not have interest in attending the concert.

In an implementation, the interstitials can be stored in a denormalized datastore that can maintain an ongoing reference to the "popularity" of all songs and users, both on an absolute/overall scale, on a relative/per-user scale, or on a relative/per-user group scale, allowing for efficient lookups both system-wide and among specific social graphs.

An example of an interstitial is the Leaderboard Leader. This can be a message telling who the overall current "most popular" user is. For example, "Damian M is dominating with 702 likes." Another example is the Leaderboard User. This can be a message that reports the position of the logged-in user on the overall popularity leaderboard. For example, "You are fifth most popular with 230 likes." Another example is the Leaderboard Friend. This is a message that mentions the position on the overall popularity leaderboard of a friend of the user that has listened to the song listened to by the user. For example, "Hery R is sixth most popular with 214 likes."

Another example is an Associative interstitial. This can be a message reporting to the user which of his other friends liked the current song. This can be displayed when the user explicitly likes a song. For example, "Steve R and 2 other friends also liked your song." Another example is an Associative Artist interstitial. This can be a message reporting to the user which other friends liked or skipped the current song's artist, where the current song is the song being listened to or has just been listened to by the user. For example, "14 of your friends skipped Jay-Z."

A Contrarian interstitial can be a message reporting to the user which of his friends performed the opposite action from the user. For example, if the user liked a song, which of the user's friends skipped the song. Likewise, if the user skipped a song, which of the user's friends liked the song. For example, "Damian M actually liked that song"

A Friend Usage interstitial can be a message that reports how often friends of the user have used a given media channel (such as Hifi Radio) in the last day, week, month, year or other period of time. For example, "Sam S has popped up on Hifi Radio 2 times this week!"

A Friend Engagement interstitial can be a message reporting to the user how often the user has listened to songs, artists, or genres that a friend of theirs has listened to as well. For example, "Omar S has listened to this artist 27 times this week."

An Artist Leaderboard interstitial can be a message showing the ranking of the current song's artist out of all artists played within the current user's social circle. For example, "Jay-Z is number six among your friends."

A Song Leaderboard interstitial can be a message showing where the current song ranks out of all songs played within the current user's social circle. For example, "That song is the 12th most popular among your friends."

A Release Date interstitial can be a message based on the release date of the current song. For example, if the song came out a long time ago, a message could be selected and presented that says "throwback." If the song were newer, it might say "fresh."

A Genre interstitial can be a message based on the genre, which may be provided from one of various ingestion resources. For example, if the song is a Rock song, the message might say something like "Rockin'."

An Artist-specific interstitial may be a manually-programmed message based on a specific artist. For example, after an Austin Mahone song, a message may be "We won't tell the Biebs."

An Event-specific interstitial may be a time-frame based message based on one or more programmed events. For example, if Giorgio Moroder is playing on the Jimmy Fallon show on a given night, the message may show, "don't miss Giorgio Moroder tonight on Fallon!"

A Default interstitial can be a fallback phrase such as "bazinga" or "dude", used in the event that none of the other interstitials apply.

In an implementation, an interstitial server system can receive an identifier of a media object presented to a user and an identifier of the user to whom the media object is presented. The interstitial server system may be coupled to a user profile database that can include demographic and social network information about the user. For example, the user profile database can include the age, gender and media object consumption history records of the user. A media object consumption history record can include an identifier of the user, the identifier of a media object presented to the user and an indication as to whether the user liked, skipped or fully consumed (e.g., played through) the media object. Other information in the record can include the date and time of consumption and social network information, such as which of the user's social network (e.g., friends) had been presented the media object and how many (and in some cases which) of the friends liked, skipped or fully consumed the media object.

The interstitial message server system may also be coupled to an interstitial message database that can contain candidate interstitial messages for presentation to users. In an implementation, the database can store records that can include an interstitial message identifier, the content (or a link to the content) of the interstitial message, and an indicator as to the type of interstitial message, e.g., a like type, a skip type, a fully consume type or a generic type. Each type relates to the circumstance under which the message is to be presented to the user. For example, a message of the like type can be presented to a user after the user likes a media object. A generic type can be presented to the user whenever the user likes, skips or fully consumes a media object, or under another circumstance when the user neither likes, skips nor fully consumes a media object. Examples of a generic type message include "Dude!" and "We'll wait for you to come back!" It may be presented, for example, when the user pauses the play of a media object.

The interstitial message server system may also be coupled to a media object database. A record in the media object database can contain such as a media object identifier, a media object genre, artist, producer, lyrics (or a pointer thereto), consumption history by type of user, the type of media object (such as song, video, photograph) and a number of times the media object has been liked, skipped and/or fully consumed. The media object record may include or be linked to a media object consumption history record or records. An example of a media object consumption history record can include a media object identifier, a user feedback type (like, skip, fully consume) and population attributes that correspond to each such type. Such population attributes can include several age ranges and the number of likes, skips and full consumptions within each age range, for each gender, for ranges of sizes of social networks (number of members of social network), by level of education (highest education is high school, college or graduate school), by geographic region (northeast, southeast, New York, Montana, Seattle, San Francisco) and other population characteristics.

The interstitial message server can receive a feedback message from a user computer indicating a like, skip or full consumption of a media object. The feedback message can include a user identifier, a media object identifier and an indicator signifying like, skip or full consumption. Upon receiving the message from the user, the interstitial message server can formulate a query based on the user feedback message and send it to the user profile database. In response, the user profile database may return a record to the server that includes consumption history information. Likewise, the interstitial message server can formulate and send a query containing a user identifier and media object identifier to a social network platform and receive in response current and/or historical information about consumption of the media object by members of the user's social network. Likewise, the interstitial message system can formulate and send a query to the media object database. In response, the media object database can send a record to the interstitial message system containing information about the media object that was liked, skipped or fully consumed by the user.

The interstitial message server system may process information from the user feedback message, the user profile database, media object database and the social network platform to select an interstitial message for presentation to the user. To select a message, the interstitial message system may formulate and send a query containing criteria for an interstitial message to the interstitial message database. In response, the interstitial message database may send an interstitial message or a pointer to an interstitial message to the interstitial message server system. Upon receiving the message or pointer from the interstitial message database, the interstitial message system may send the interstitial message or pointer thereto to the user.

In an implementation, the interstitial message server system may receive a like user feedback message and determine from the user profile database that the user's consumption history shows that the majority of media objects consumed are country music songs. The interstitial media server system may also determine from the media object database that the song liked by the user is a country music song by Chet Atkins. The server system may also determine from a social platform that two of the user's friends have recently consumed Chet Atkins songs as well as numerous Buck Henry songs. The server system may formulate a query to the interstitial message database that includes the genre (country music) and media type (song). The interstitial media database may return a text message that includes "Classic country is the best!" The server system may modify this message by adding additional information based on responses from the social network platform "Classic country is the best! Your friends Jack and Mary listen to lots of Chet Atkins. They also like Buck Henry." In this way, information obtained from multiple sources can be advantageously combined to provide an engaging interstitial message that is relevant to the user to whom it is sent.

FIG. 1 shows an example arrangement suitable for selecting and providing interstitial messages to users. An interstitial message server system 100 can include a communications device 102 suitable for sending database queries, receiving results and sending and receiving messages to and from users, as well as performing other kinds of communication. Server system 100 can also include an interstitial message processor 103 capable of selecting and/or generating interstitial messages. Such interstitial messages can be sent from the processor 103 to the communications device 102, which can send the messages on to users. For example, Interstitial Message Server System 100 may receive a user identifier, a media object identifier and a like, skip or playthrough (i.e., the media object was played all the way through at the user computer) indication from a user computer.

Communications device 102 can be in communication with Interstitial Message Database 104, which can include Interstitial Message Database server coupled to a storage medium 106 that stores interstitial message content 107. Communications device 102 can send queries to Interstitial Message Database Server 105, and receive responses from server 105 that contain interstitial message content. For example, the Interstitial Message Server System 100 may send a query to Interstitial Message Database 104 that can include a media object identifier that Interstitial Message Database Server 105 can use as a basis for identifying interstitial messages in storage 106 that are related to the media object.

Communications device 102 can be in communication with Social Network Database 108 through Social Network Database Server 109, coupled to Storage 110 containing Social Network Information 111. Communications device 102 can send queries to Social Network Database Server 109, and receive responses from server 109 that contain social network information. For example, Interstitial Message Database Server 105 can send a query to Social Network Database 108 that can include a user identifier. Social Network Database Server 109 can use the query to find social network information corresponding to the user identifier. For example, the database 109 can return a list of members of a network corresponding to the identified user. Likewise, the query may also include a media object identifier, in which case the server 109 may return a result indicating which of the members of the social network (e.g., using member identifiers) have liked, skipped and/or played through the identified media object, the date and time of such events and comments provided by the identified members.

Communications device 102 can be in communication with Media Object Database 112 through Media Object Database Server 113, coupled to Storage 114 containing Media Object Information 115. Communications device 102 can send queries to Media Object Database Server 113, and receive responses from server 113 that contain social network information. For example, Interstitial Message Server System 100 may send a query that includes a media object identifier received from a user and receive in response information about the media object, such as title, artist, lyrics, producer, release date and related information.

Information received from one or more of the databases 104, 108 and/or 112 can be conveyed from Communications Device 102 to Interstitial Message Processor 103. The message processor 103 can use such information to select and/or generate interstitial message content that can be sent to the user through Communications Device 102. Interstitial Message Server System can generate and send an interstitial based on information from one or more of such databases and does not require information from all three. Further, information from other databases, such as user profile information from a user profile database (not shown) may also be used.

In an implementation, the Interstitial Message Server System 100 can identify a media object that is being presented to the user or will be presented to the user. Based upon an identifier of the media object, the server system 100 can select an interstitial message corresponding to each of three user computer event types: like, skip and playthrough. This can be accomplished before the event is detected and/or even takes place. The selected interstitial messages (e.g., one each for like, skip and playthrough) can be sent to the user computer while the media object is being played or before it is played. In an embodiment, software code at the user computer can detect a user event such as a like, a skip (during or at the end of play of a media object) and a playthrough (towards or at the end of the media object presentation period) and cause the corresponding interstitial message to be presented as soon as the event is detected or as soon as the media object presentation period is over, such as at the end of a song. In implementations, the delay between the time a user event is detected and the time the interstitial message is presented can be no more than 5 milliseconds, 10 milliseconds, 25 milliseconds, 50 milliseconds, 100 milliseconds, 200 milliseconds, 500 milliseconds, 1 second and 1500 milliseconds. The immediacy with which the interstitial is presented in relation to the detection of the event can advantageously produce a seamless user experience that the user will find relevant and engaging. It should be noted that in these and other implementations, the interstitial can be selected based on additional information from the Social Network Database 108, the Media Object Database 112 and other databases such as a user profile database.

Likewise, a subsequent media object can at least begin to be sent to the user before the interstitial message is displayed or while it is being displayed. For example, the subsequent media object can begin to be sent before or while a text interstitial message is displayed and before or while a video interstitial is displayed. The subsequent media object can begin to be presented to the user shortly after the text interstitial message is displayed, or shortly after the end of the video interstitial message. This too can advantageously create a seamless experience for the user during which the user is not made to wait too long to experience the next media object after consuming the prior media object and the interstitial message.

Interstitial Message Processor 103 can implement a model for selecting and generating interstitial messages. For example, another source of information upon which Interstitial Message Server System 100 can base its selection of interstitial messages can include geolocation information. Geolocation information can be static (e.g., the user's known home address) or dynamic (e.g., the user's detected location based on GPS or other location signaling technology, such as from the user's smartphone, tablet, laptop, etc.) Geolocation information received at server system 100 can be used to send information such as concert promotion to the user in the interstitial. In an implementation, the system 100 can receive geolocation information about the user and compare it to upcoming tour locations (e.g., concert venues) that can be received from the Media Object Database 112 or another database (such as a ticketing service). Processor 103 can generate an interstitial message announcing a tour date and include a link to a ticketing site when the user location is less than 100 miles (or any other suitable distance) from a tour location of an artist corresponding to the media object. For example, a user that generates a like event in response to a Taylor Swift song presented to the user may be presented with an interstitial message that says "See Taylor Swift in concert on May 10 at Smith Memorial Stadium. Buy your tickets here." The word "here" may be a link that, when selected by the user, causes the user's computer to fetch a web page of a ticketing site through which the user can buy tickets to that concert.

Figure 2:
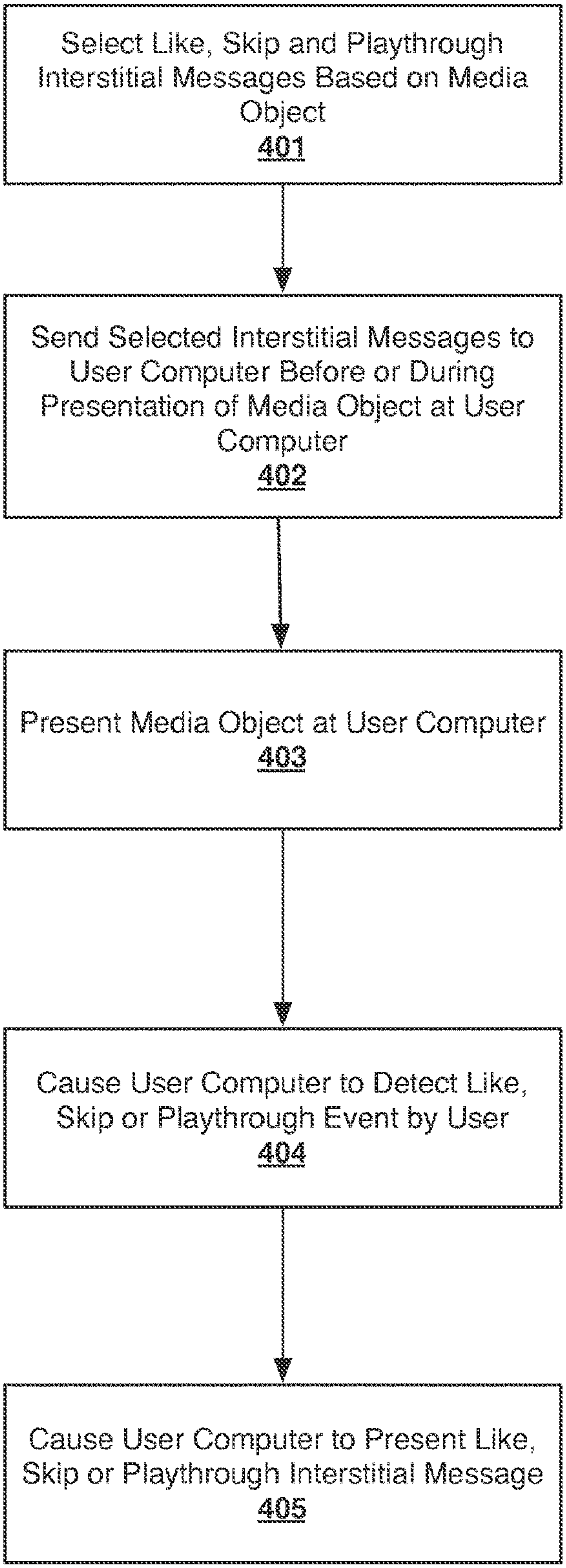
FIG. 2 shows an example process according to an implementation of the disclosed subject matter.

FIG. 2 shows an example process in accordance embodiments disclosed herein. A set of interstitial messages can be selected 401 based upon a media object identifier or information derived from the media object identifier. The media object identifier can correspond to a media object that will be presented at the user computer in the future, or that is currently being presented. Media object information can be obtained from a media object database. For example, the interstitial messages can be selected based upon media object information contained in a response to a query sent to the media object database. The query can include the media object identifier and the response can include media object attributes such as media object title, media object artist, author and/or producer, media object lyrics or script, media object play duration, media object type (e.g., song or video), media object rights (e.g., play, copy or no copy, download or stream only, etc.)

Likewise, the interstitial messages can be selected based upon user identifier. A query that can include the user identifier can be sent from the interstitial message server system to a user profile database. In response, the user profile database can send to the interstitial message server system geolocation information about the user, demographic information such as gender, age, age range, home address information, network provider and network bandwidth information, and media object consumption history for the user, such as identifiers of media objects consumed in the past by the user and which media objects the user liked, skipped and played through.

Interstitial messages can also be selected based upon geolocation data about the user. Such geolocation data can be received by the interstitial message server system in response to a query containing the user identifier sent from the interstitial message server system to the user profile database. Geolocation data may also be obtained by sending a query for geolocation data and receiving the same in response or receiving a message containing geolocation data without sending a query (e.g., via push technology) from user computer. The user computer can be any user device with a computer processor and memory, such as a smartphone, tablet, laptop and set top box.

The set of selected interstitial messages can be sent 402 to the user computer before or during the play of the media object at the user computer. This can advantageously position the interstitials on the user computer to enable them to be rendered by the user computer timely in connection with the presentation of the media object.

The media object can be presented 403 to the user on the user computer. A text media object may be shown to a user on a display of the user computer. A song may be played through the speakers of a user computer. A video may be shown on the user computer screen and its corresponding sound may be played through the user computer speakers. Various kinds of media (such as text, video, audio) may occur in combination in a media object.

The user computer can detect a user event 404 having a type that can be a like type, a skip type or a playthrough type. A like type user event can be generated when the user selects a user interface element, a keyboard entry or issues a voice command that indicates that the user likes the media object being rendered. A skip type user event can be generated when the user selects a user interface element, a keyboard entry or issues a voice command that causes the play of the media object to be stopped before it has been fully consumed and leads to a subsequent media object to be played. A playthrough user event can be generated when the user consumes substantially all of the media object, such as when the user permits a song or video to play all the way to the end, or almost to the end. In some cases, a skip indication may be designated by the interstitial message server system as a playthrough type user event when the skip type event occurs during the last one to five percent of the play duration of the media object, or when the skip type user event occurs within the last ten to fifteen seconds of the play duration of the media object. In such cases, the user may have enjoyed the media object and become impatient to play the subsequent media object.

Upon detecting user event, the user computer can be caused to present the like, skip or playthrough interstitial message that corresponds to the detected user event type (like, skip or playthrough). Because the three types of interstitial message have already been sent to and stored on the user computer, the implementation can advantageously present without delay the interstitial message corresponding to the user event. Thus, a skip type interstitial message (such as "If you don't like Chet Atkins, try Garth Brooks") can be shown very shortly after the skip type user event is detected, without the delay that would be caused by sending a request for a skip-type interstitial message to a remote server, having the remote server select and/or send the skip-type interstitial message to the user computer and then cause the user computer to show the interstitial message. Displaying the interstitial message promptly after the event is detected produces more immediate, seamless user experience than would be the case were there a more substantial delay between the time the user event is detected and the time the user can see the interstitial message.

Likewise, the like type interstitial message can be immediately shown after the user likes the media object, or else around or after the end of the period of play of media object. For example, a like type interstitial message ("Dinner at Nine is the sequel to Lunch at Noon") can be shown towards the end or after a user-liked film Dinner at Nine is consumed. And a playthrough interstitial can be shown toward or after the end of play of a media object.

The time during which an interstitial message is played can be used to send a subsequent media item (download or stream) to the user computer. This can advantageously position at least the beginning of the subsequent media object to start playing with minimal delay after the interstitial is shown. The time at which the subsequent media object is started to be presented (e.g., played, shown) can be a fixed amount of time after a text interstitial message is shown to allow the user enough time to read it. The time to start play may also be keyed to the end of play of a video interstitial, giving the user enough time to see the whole interstitial through before the subsequent media object is played. This staging of the subsequent media object also helps to produce a more seamless, engaging user experience.

In some implementations, the interstitials themselves can be subject to user feedback in the form of like, skip and playthrough user events. For example, a user may select an element of a user interface that can indicate that the user likes or wants to skip the interstitial message itself. Another kind of detectable user event occurs when the user neither likes nor skips but permits the interstitial to play all the way through. This feedback information about the interstitial messages shown to the user can be stored in an interstitial feedback database and used as an input in selecting subsequent interstitials for the user, for other users who are members of the user's social network, and so on. For example, the interstitial message server system may stop serving video-type interstitial messages to a user who consistently skips video-type interstitial messages but does not skip text-only video messages. Likewise, the interstitial message server system may preferentially select interstitial messages with similar content or type for users for whom like type user events are detected in connection with a given interstitial message or messages.

Figure 3:
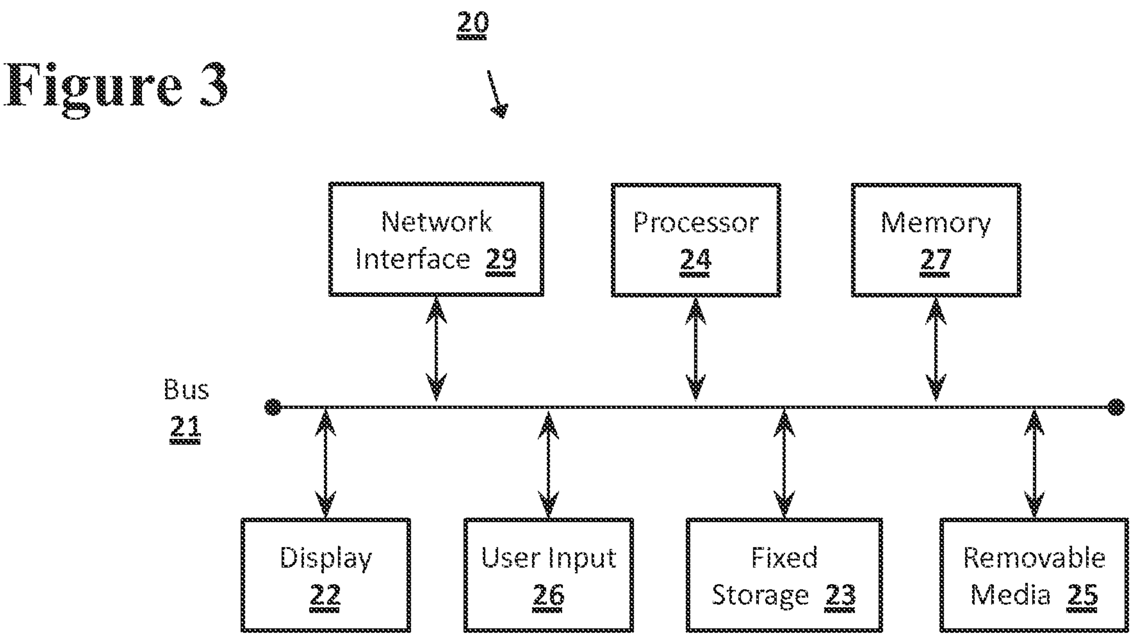
FIG. 3 shows a computer according to an embodiment of the disclosed subject matter.

Implementations of the presently disclosed subject matter may be implemented in and used with a variety of component and network architectures. FIG. 3 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
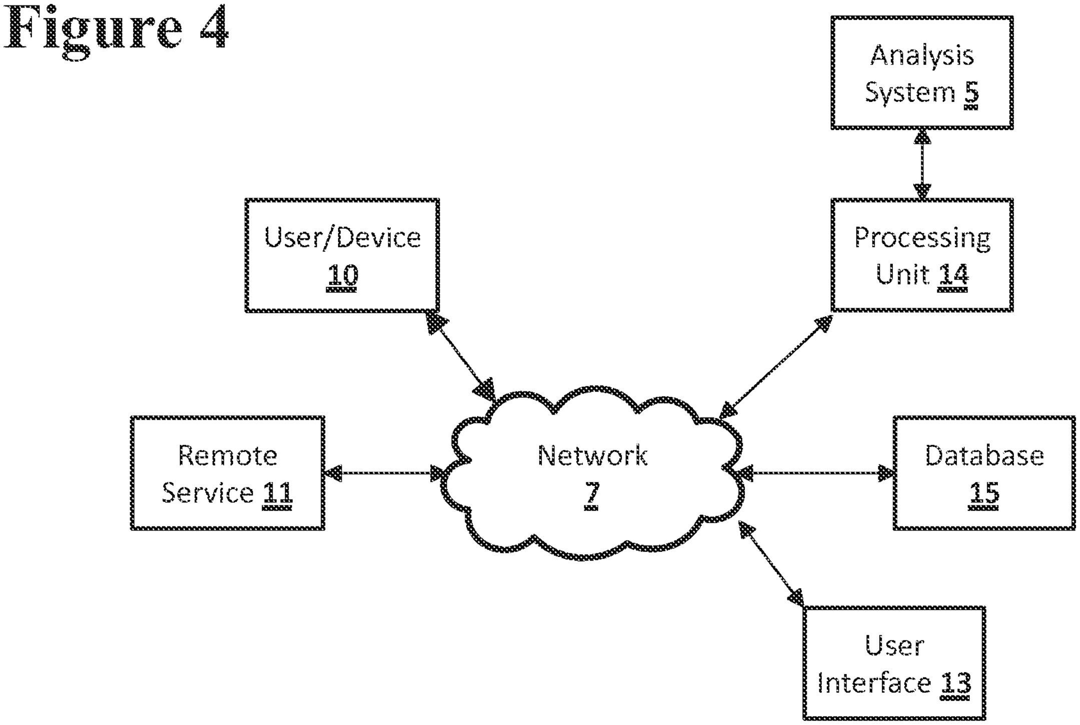
FIG. 4 shows a network configuration according to an embodiment of the disclosed subject matter.

FIG. 4 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:

selecting, by a processor, a subset of user-specific media objects for automatic playback on a user device associated with a user;

receiving, at the processor, an indication that a first media object is to be presented for automatic playback on the user device;

receiving, at the processor, a user identifier of the user;

receiving, at the processor, information about members of a social network of the user;

based at least in part on the user identifier and the information about members of the social network of the user, generating, by the processor, a first like type interstitial message, a first skip type interstitial message, and a first playthrough type interstitial message for the first media object;

transmitting, by the processor and to the user device, an indication of the first like type interstitial message, the first skip type interstitial message, and the first playthrough type interstitial message;

receiving, at the processor, an indication that a skip user event is detected on the user device before or during playback of the first media object on the user device, wherein the skip user event skips a remainder of playback of the first media object, and triggers an indication that a second media object in the subset of user-specific media objects is to be presented for automatic playback on the user device;

based at least in part on receiving the indication that the skip user event is detected, transmitting, by the processor and to the user device, the first skip type interstitial message, wherein the first skip type interstitial message is configured to be provided following the indication of the skip user event and prior to automatic playback of the second media object on the user device;

based at least in part on the user identifier and the information about members of the social network of the user, generating, by the processor, a second like type interstitial message, a second skip type interstitial message, and a second playthrough type interstitial message for the second media object; and transmitting, by the processor and to the user device, an indication of the second like type interstitial message, the second skip type interstitial message, and the second playthrough type interstitial message.

2. The method of claim 1, wherein generating an interstitial message comprises:

retrieving, from a storage device communicatively coupled to the processor, content for the interstitial message.

3. The method of claim 1, wherein content of an interstitial message is based on geolocation information of the user device.

4. The method of claim 3, further comprising:

comparing, at the processor, the geolocation information of the user device and a location of a future live performance by an artist associated with the first media object; and determining, at the processor, that a difference between a location associated with the geolocation information of the user device and the location of the future live performance is less than a threshold, in response to a determination that the difference is less than the threshold, including information about the future live performance in the content of the first skip type interstitial message, the first like type interstitial message, and the first playthrough type interstitial message.

5. The method of claim 1, further comprising sending the second media object to the user device while the user device presents the first skip type interstitial message.

6. The method of claim 1, wherein the first skip type interstitial message is one of a text message, an audible message, or a video message.

7. The method of claim 1, wherein a content of the first skip type interstitial message indicates a number of the members of the social network of the user who skipped playback of the first media object.

8. The method of claim 1, wherein a content of an interstitial message includes one or more of (i) information associated with a media object, (ii) information associated with how the members of the social network of the user have interacted with the media object, or (iii) information associated with a creator of the media object.

9. A system comprising:

a storage device configured to store interstitial messages, the interstitial messages related to media objects; and a processor configured to:

select a subset of user-specific media objects for automatic playback on a user device associated with a user;

receive an indication that a first media object is to be presented for automatic playback on the user device;

receive a user identifier of the user;

receive information about members of a social network of the user;

based at least in part on the user identifier and the information about members of the social network of the user, generate a first like type interstitial message, a first skip type interstitial message, and a first playthrough type interstitial message for the first media object;

transmit an indication of the first like type interstitial message, the first skip type interstitial message, and the first playthrough type interstitial message;

receive an indication that a skip user event is detected on the user device before or during playback of the first media object on the user device, wherein the skip user event skips a remainder of playback of the first media object, and triggering an indication that a second media object in the subset of user-specific media objects is to be presented for automatic playback on the user device;

based at least in part on receiving the indication that the skip user event is detected, following the indication that the skip user event was detected, transmit, to the user device, the first skip type interstitial message, wherein the first skip type interstitial message is configured to be provided prior to automatic playback of the second media object on the user device;

based at least in part on the user identifier and the information about members of the social network of the user, generate a second like type interstitial message, a second skip type interstitial message, and a second playthrough type interstitial message for the second media object; and transmit an indication of the second like type interstitial message, the second skip type interstitial message, and the second playthrough type interstitial message.

10. The system of claim 9, wherein the processor retrieves content for an interstitial message from the storage device.

11. The system of claim 10, wherein the retrieved content is based at least in part on one or more of the user identifier or information about the members of the social network.

12. The system of claim 9, wherein content of an interstitial message is based on geolocation information of the user device.

13. The system of claim 12, wherein the processor is further configured to:

compares the geolocation information of the user device and a location of a future live performance by an artist associated with the first media object;

determines that a difference between a location associated with the geolocation information of the user device and the location of the future live performance is less than a threshold, and in response to a determination that the difference is less than the threshold, include information about the future live performance in the content of the first skip type interstitial message, the first like type interstitial message, and the first playthrough type interstitial message.

14. The system of claim 9, the processor further configured to send the second media object to the user device while the user device presents the first skip type interstitial message.

15. The system of claim 9, wherein the first skip type interstitial message is one of a text message, an audible message, or a video message.

16. One or more non-transitory computer-readable media storing instructions executable by one or more processors that, when executed by the one or more processors, cause the one or more processors to perform acts comprising:

selecting, by a processor, a subset of user-specific media objects for automatic playback on a user device associated with a user;

receiving, at the processor, an indication that a media object is to be presented for automatic playback on the user device;

receiving, at the processor, a user identifier of the user;

receiving, at the processor, information about members of a social network of the user;

based at least in part on the user identifier and the information about members of the social network of the user, generating, by the processor, a like type interstitial message, a skip type interstitial message, and a playthrough type interstitial message for the media object;

transmitting, by the processor and to the user device, an indication of the like type interstitial message, the skip type interstitial message, and the playthrough type interstitial message;

receiving, at the processor, an indication that a skip user event is detected on the user device before or during playback of the media object on the user device, wherein the skip user event skips a remainder of playback of the media object, and triggers an indication that a next media object in the subset of user-specific media objects is to be presented for automatic playback on the user device; and based at least in part on receiving the indication that the skip user event is detected, transmitting, by the processor and to the user device, the skip type interstitial message, wherein the skip type interstitial message is configured to be provided following the indication of the skip user event and prior to automatic playback of the next media object on the user device.

17. The one or more non-transitory computer-readable media of claim 16, wherein generating an interstitial message comprises:

retrieving, from a storage device communicatively coupled to the processor, content for the interstitial message.

18. The one or more non-transitory computer-readable media of claim 17, wherein the retrieved content is based at least in part on at least one of the user identifier or information about the members of the social network.

19. The one or more non-transitory computer-readable media of claim 16, wherein content of an interstitial message is further based on geolocation information of the user device.

20. The one or more non-transitory computer-readable media of claim 19, further comprising:

comparing the geolocation information of the user device and a location of a future live performance by an artist associated with the media object; and determining, at the processor, that a difference between a location associated with the geolocation information of the user device and the location of the future live performance is less than a threshold, in response to a determination that the difference is less than the threshold, including information about the future live performance in the content of the skip type interstitial message, the like type interstitial message, and the playthrough type interstitial message.

* * * * *